United States Patent Office 3,761,425
Patented Sept. 25, 1973

3,761,425
PROCESS FOR PREPARING SULFIDED PLATINUM ON CARBON CATALYSTS
Konrad Baessler, Frankfurt am Main, and Kurt Mayer, Burgkirchen an der Alz, Germany, assignors to Farbwerke Hoechst Aktiengesellschaft vormals Meister Lucius & Bruning, Frankfurt am Main, Germany
No Drawing. Filed Feb. 19, 1971, Ser. No. 117,078
Int. Cl. B01j *11/74*
U.S. Cl. 252—439    12 Claims

ABSTRACT OF THE DISCLOSURE

Sulfided platinum on carbon catalyst being useful in the selective hydrogenation of halonitroaromates are obtained by saturating a particulate platinum on carbon catalyst with hydrogen in an acidic aqueous medium and treating it with defined amounts of a sulfidizing agent. Said catalysts maintain their activity and selectivity for numerous hydrogenations.

---

The present invention relates to a process for preparing sulfided platinum on carbon catalysts.

From U.S. Pat. No. 3,275,567 there are known sulfided platinum on carbon catalysts obtainable by admixing carbon particles having an active surface area greater than 800 m.$^2$/g., with an aqueous compound with an alkaline agent, reducing the platinum oxide precipitated on the carbon support and treating the resulting platinum on carbon catalyst in an aqueous suspension with a sulfidizing agent, such as gaseous hydrogen sulfide. The sulfidizing agent is used in a 100% excess over the theoretical amount required for convering the metallic platinum into PtS$_2$.

In contrast to the unsulfided platinum catalysts which cause a considerably dehalogenation in the catalytic reduction of nitro aromatic hydrocarbons containing chlorine, the sulfided platinum catalysts exhibit high selectivity, i.e. the splitting off of chlorine is nearly completely restrained, without affecting the complete reduction of the nitro group to the amino group.

Thus, this type of catalyst permits the preparation of chlorinated aromatic amines of high quality. In the technical application, however, it is necessary, with regard to the high cost platinum, that the catalyst can be used several times without a considerable loss of activity. Due to its selectivity, the catalyst obtained in accordance with the process of U.S. Pat. No. 3,275,567 is certainly well suited for catalytic reduction of chlorinated nitro aromatic hydrocarbons to the corresponding amines. However, this catalyst very quickly loses its initial activity without any perceptible reason, so that it can be only a few times re-employed in the reaction. Thus, a determined amount of catalyst allows the preparation of an amount of amines which is completely insufficient for the economy of the process. Another disadvantage of the known method consists in the fact that the preparation of this catalyst is difficult and time-consuming and that its properties can be only reproduced with difficulty.

It has now been found that sulfided platinum on carbon catalysts having superior efficiency can be prepared by suspending a particulate platinum on carbon catalyst having an active surface area of at least 800 m.$^2$/g. in an aqueous medium, the pH-value of which ranges between about 0 and 5, saturating the catalyst with hydrogen at normal pressure of slightly elevated pressure and subsequently treating it with a sulfidizing agent with the proviso that, per mol of hydrogen absorbed by the catalyst, 0.3–0.7 mol of hydrogen sulfide are absorbed, whereupon the thus-obtained sulfided platinum on carbon catalyst is recovered from the aqueous suspension in known manner.

As starting material for preparing sulfided platinum on carbon catalysts, there may be used commercial platinum on carbon catalysts. These catalysts expediently contain about 4–10 percent by weight, preferably about 4–6 percent by weight of metallic platinum.

As starting material there are expediently used those catalysts, the finely divided metallic platinum of which has an average crystallite size of less than 20 Angstrom units and a metal surface area between about 6 to 12 m.$^2$/g., preferably between about 8 to 10 m.$^2$/g. Furthermore, the support of the platinum on carbon catalyst should expediently have the particle size distributed in such a way that at least 40 percent by weight have a diameter of less than 20µ.

The particulate platinum on carbon catalyst is suspended in an aqueous medium, the pH-value of which is between 0 and 5. The weight ratio of the catalyst (dry bases) to the aqueous medium is expediently situated with in the range of about 1:5 and 1:20. For adjusting the mentioned pH range, there may be used all inorganic and organic acids which have no oxidizing effect under the conditions of treatment and do not react with hydrogen sulfide. For the purpose there are expediently used sulfuric acid, phosphoric acid, hydrohalic acids or lower aliphatic carboxylic acids, such as formic acid, acetic acid or propionic acid, preferably sulfuric acid. The obtained suspension of the catalyst is contacted while stirring with hydrogen until the catalyst is completely saturated. By this operation, elementary hydrogen is occluded until saturation in the platinum metal finely divided on the support. The temperature of the suspension during saturation ranges expediently between about 10 and 50° C., preferably between about 20 and 30° C. The saturation with hydrogen is preferably effected at normal pressure or also at slightly higher pressures which preferably do not exceed 1 atmosphere gauge. The amount of hydrogen absorbed under the mentioned conditions generally is about 400–500 ml. of hydrogen at 20° C., calculated on 1 g. of platinum metal.

The mentioned saturation value always refers to normal pressure. The saturation time is usually between about 20 minutes and 1 hour.

Subsequently, the resulting suspension of the platinum catalyst saturated with hydrogen is treated with a sulfidizing agent. It is essential that the sulfidizing agent is only used in such an amount that per mol of hydrogen absorbed by the catalyst, about 0.3 to 0.7 mol of hydrogen sulfide are absorbed by the catalyst. Sulfidizing is preferably carried through in such a way that per mole of absorbed hydrogen 0.45 to 0.55 mol of hydrogen sulfide are absorbed by the catalyst. The temperature during the sulfidizing operation expediently ranges between about 10 and 50° C., preferably between about 20 and 30° C. As a sulfidizing agent, there is preferably used hydrogen sulfide. However, water-soluble alkali metal or ammonium sulfides or ammonium hydrogensulfides, such as ammonium sulfides, sodium or potassium sulfides or ammonium, sodium or potassium hydrogensulfides, which generate hydrogen sulfide in the acid medium, may also be used. The latter compounds are introduced while stirring into the suspension of the platinum catalyst saturated with hydrogen, expediently in form of aqueous solutions with a content between about 0.5 to 10 percent by weight, preferably with about 1 to 4 percent by weight.

The so-obtained sulfided platinum on carbon catalyst is then separated from the liquid, for example by filtration. Subsequently, it is expediently washed with distilled water. The resulting catalyst contains about 50 percent by weight of water it may be employed in this form.

The catalyst prepared according to the invention is particularly well suited for the reduction of nitro aromates containing halogens, preferably chlorine, to the corresponding amines. These nitro aromates which may be reduced by means of the catalyst prepared according to the invention are chloro-nitro-benzenes, dichloro-nitrobenzenes and chloro nitro methylbenzenes. The reduction of the halogenated nitro aromates by means of the catalyst prepared according to invention is carried out under the usual conditions for the reduction of halogenated nitro aromates to the corresponding amines. Due to the very good selectivity of the catalysts according to the invention, the splitting off of halogen is below 0.1%, calculated on the amount by weight of the chlorine originally present. Hence, the reduction effected by means of these catalysts yields very pure final products so that expensive and complicated purification operations for amines are superfluous. Furthermore, these amines are obtained with very good to almost quantitative yields. Another essential advantage of the catalyst prepared according to invention consists in the fact that they may be employed for a relatively great number of reductions, without their activity and selectivity being considerably reduced. The sulfided platinum on carbon catalysts may be employed for about 10 to 30 reductions, depending on the type of the nitro compounds to be reduced, and the same results are always obtained. Because of the high price of platinum, this property of the present catalysts is decisive as concerns the rentability in the preparation of halogenated amines from the corresponding halogenated nitro compounds. Another advantage of the present process consists in the fact that the properties of the catalysts prepared according to this process are exactly reproduceable without difficulty.

It was quite surprising and not forseeable that a sulfided platinum catalyst showing the above-mentioned optimal properties is obtained only if the platinum metal is saturated with hydrogen before being treated with the sulfidizing agent and if a determined ratio of absorbed sulfidizing agent to absorbed hydrogen is observed in the sulfiding process.

In the following examples, the parts and percentages are by weight unless otherwise specified.

EXAMPLE 1

In a high energy stirrer supplied with nitrogen, 25 g. of a catalyst of the type of 5% platinum on carbon (crystallite size: about 10 Angstrom units; metal surface area: about 10m.$^2$/g.; specific surface area (BET): 800 m.$^2$/g.; size of the carbon particles: about 44% <20$\mu$; about 99% <80$\mu$) were carefully suspended in a mixture of 500 ml. of water and 8 g. of 75% sulfuric acid at a temperature of 22° C. The solids were allowed to deposit, and the nitrogen covering the liquid was expelled by hydrogen. Into the closed apparatus, hydrogen was passed into the well-stirred suspension, from a storage cylinder having a liquid jacket regulated by a thermostat. About 30 minutes later, the saturation was complete. The volume of the occluded hydrogen could be checked from a scale of the storage cylinder. It amounted to 600–630 ml. at 22° C. Then the hydrogen covering the sedimentary catalyst was substituted by hydrogen sulfide gas. The gassing with $H_2S$ was effected while stirring in a similar way as the gassing carried through with $H_2$ from a graduated cylinder controlled by a thermostat, the apparatus being closed. When about 300 ml. of $H_2S$ were absorbed at 22° C., stirring was stopped, and the apparatus was flushed with nitrogen until it was free from hydrogen sulfide. The catalyst was separated from the liquid by filtration and washed with distilled water. It was applied in moist state with a water content of about 50%.

COMPARATIVE EXAMPLE

The catalyst suspension specified in Example 1 was prepared; it was allowed to deposit and —without previous treatment with hydrogen—the nitrogen covering the liquid was substituted by hydrogen sulfide. Subsequently, the mixture was gassed while stirring with $H_2S$, until about 300 ml. of $H_2S$ were absorbed. It was flushed with nitrogen, the catalyst was filtered and washed with distilled water.

EXAMPLE 2

The process of Example 1 was repeated for 4 times, the aqueous medium consisting each of 500 ml. of 1% sulfuric acid, 1% phosphoric acid, 2% formic acid, respectively 2% acetic acid.

EXAMPLE 3

Into a suspension of a 5% platinum on carbon catalyst prepared according to Example 1 and saturated with hydrogen, 70 ml. of a 1% aqueous sodium hydrogen sulfide solution were passed by stirring beneath the liquid surface at 25° C. and within 15 minutes. After flushing with nitrogen, the catalyst was filtered and washed with water.

EXAMPLE 4

The catalysts of the Examples 1 to 3 were tested as to their efficiency in the catalystic reduction of 2-chloro-nitrobenzene to 2-chloro-aniline. Each test was carried out in a 2 l. autoclave of stainless steel according to the following method:

A mixture of 340 parts of 2-chloro-nitrobenzene and 500 parts of methanol were mixed with 9 parts of catalyst and reduced at 80° C., the hydrogen pressure being 10 to 50 atmospheres gauge. When the reaction was complete, the catalyst was filtered and the filtrate was worked up to yield 2-chloro-aniline. The filtered catalyst was recycled to the next reduction without any further purification. Thus, the catalysts prepared according to Examples 1 to 3 could be employed up to 30 times. In spite of their great activity—the reaction time was only 30 minutes per batch—they had an excellent selectivity. The splitting off of chlorine was less than 0.1%, calculated on the amount by weight of the chlorine originally present. Thus, products of high purity and stability were obtained in nearly quantitative yields.

In contradistinction thereto, the catalyst prepared according to the process of the comparative example showed a very reduced activity which became apparent in a reaction time of 5 hours. It could not be used another time.

EXAMPLE 5

The catalyst prepared according to the process of Example 1 was tested following the method described in Example 4 in relation to other chloro nitro aromates as to selectivity (splitting off of chlorine), activity (reaction time) and frequency of application.

The following nitro aromates were reduced to the corresponding amines:

(a) 3-chloronitrobenzene
(b) 4-chloronitrobenzene
(c) 2,5-dichloronitrobenzene
(d) 3,4-dichloronitrobenzene
(e) 2,6-dichloronitrobenzene
(f) 6-chloro-2-nitro-1-methylbenzene
(g) 4-chloro-2-nitro-1-methylbenzene All compounds had an average reaction time of less than 1 hour, the splitting off of chlorine was less than 0.1%, calculated on the amount by weight of the chlorine originally present, and the catalyst could be used—depending on the nitro compound to be reduced—for 10 to 30 reductions. The yields of amines attained were between about 95% and 99% of the theoretical yields.

We claim:

1. A process for the preparation of sulfided platinum on carbon catalysts, wherein a particulate platinum on carbon catalyst having an effective surface of at least 800 m.$^2$/g. is suspended in an aqueous medium of a pH in the range of 0 to 5, saturated with hydrogen at a pressure in the range of normal pressure to 1 atmg., treated with 0.3 to 0.7 mol of a sulfidizing agent per each mol of hydrogen absorbed and isolated from the aqueous medium.

2. The process as claimed in claim 1, wherein the effective surface of the particulate platinum on carbon catalyst is about 800 to 1,600 m.²/g.

3. The process as claimed in claim 1, wherein said platinum on carbon catalyst contains 1 to 10% by weight of platinum metal.

4. The process as claimed in claim 1, wherein said platinum on carbon catalyst contains 4 to 6% by weight of metallic plantium.

5. The process as claimed in claim 1, wherein the platinum in said catalyst has an average crystallite size of less than 20 Angstrom units.

6. The process as claimed in claim 1, wherein the platinum particles in said catalyst have a surface of 6 to 12 m.²/g.

7. The process as claimed in claim 1, wherein the platinum particles in said catalyst have a surface of 8 to 10 m.²/g.

8. The process as claimed in claim 1, wherein the saturation with hydrogen is performed at a temperature of 10 to 50° C.

9. The process as claimed in claim 1, wherein the saturation with hydrogen is performed at a temperature of 20 to 30° C.

10. The process as claimed in claim 1, wherein said sulfidizing agent is selected from the group consisting of hydrogen sulfide, an alkali metal sulfide, ammonium sulfide, an alkali metal hydrogen sulfide, and ammonium hydrogen sulfide.

11. The process as claimed in claim 1, wherein 0.45 to 0.55 mol of hydrogen sulfide per each mol of hydrogen absorbed are used.

12. A sulfided platinum on carbon catalyst obtained by suspending a particulate platinum on carbon catalyst having an effective surface of at least 800 m.²/g. in an aqueous medium of a pH in the range of 0 to 5, saturating with hydrogen at a pressure in the range of normal pressure to 1 atm. g., treating with 0.3 to 0.7 mol of a sulfidizing agent per each mol of hydrogen absorbed and isolating the catalyst from the aqueous medium.

References Cited
UNITED STATES PATENTS

| | | | |
|---|---|---|---|
| 3,275,567 | 9/1966 | Keith et al. | 252—439 |
| 3,261,869 | 7/1966 | Johnson et al. | 252—439 X |
| 3,336,386 | 8/1967 | Dovell et al. | 252—439 X |

PATRICK D. GARVIN, Primary Examiner

U.S. Cl. X.R.

260—580